United States Patent [19]

Tsenter et al.

[11] Patent Number: 5,290,640

[45] Date of Patent: Mar. 1, 1994

[54] SEALED RECHARGEABLE BATTERY

[75] Inventors: Boris Tsenter, Jerusalem, Israel; Menahem Anderman, Phoenix, Ariz.

[73] Assignee: Acme Electric Corporation, East Aurora, N.Y.

[21] Appl. No.: 29,136

[22] Filed: Mar. 10, 1993

[51] Int. Cl.[5] .......................................... H01M 10/52
[52] U.S. Cl. .......................................... 429/9; 429/57; 429/62; 429/101
[58] Field of Search ........................ 429/57, 58, 59, 61, 429/62, 24, 25, 9, 101

[56] References Cited

U.S. PATENT DOCUMENTS

| | | |
|---|---|---|
| 1,016,874 | 2/1912 | Edison . |
| 2,104,973 | 1/1938 | Dassler . |
| 3,080,440 | 3/1963 | Ruetschi, et al. . |
| 3,096,215 | 7/1963 | Voss et al. . |
| 3,305,404 | 2/1967 | Sundberg . |
| 3,410,725 | 11/1968 | Harivel . |
| 3,424,617 | 1/1969 | Grieger et al. . |
| 3,470,025 | 9/1969 | Yehiely . |
| 3,554,804 | 1/1971 | Carson, Jr. ............... 429/58 |
| 3,554,805 | 1/1971 | Weinstock ............... 429/58 |
| 3,598,653 | 8/1971 | Fukuda et al. . |
| 3,622,397 | 11/1971 | Belove . |
| 3,622,398 | 11/1971 | Sekido et al. . |
| 3,630,778 | 12/1971 | Kreidl et al. . |
| 3,701,691 | 10/1972 | Sassmannshausen et al. . |
| 3,769,088 | 10/1973 | Seiger et al. ............... 429/58 |
| 3,817,717 | 6/1974 | Kreidl, et al. . |
| 3,977,906 | 8/1976 | Beatty et al. . |
| 3,990,910 | 11/1976 | Giner et al. . |
| 4,113,924 | 9/1978 | Kantner . |
| 4,143,212 | 3/1979 | Ueno et al. . |
| 4,216,274 | 8/1980 | Bruning et al. . |
| 4,224,384 | 9/1980 | Kozawa et al. . |
| 4,346,151 | 8/1982 | Uba et al. . |
| 4,383,011 | 5/1983 | McClelland et al. . |
| 4,407,911 | 10/1983 | Hooke . |
| 4,434,214 | 2/1984 | Suzuki . |
| 4,689,544 | 8/1987 | Stadnick et al. . |
| 4,696,873 | 9/1987 | Yagasaki et al. . |
| 4,728,586 | 3/1988 | Venkatesan et al. . |
| 4,769,299 | 9/1988 | Nelson . |
| 4,898,794 | 2/1990 | Doi et al. . |
| 4,900,642 | 2/1990 | Tomantschger et al. . |
| 4,925,746 | 5/1990 | Pavlov et al. . |
| 4,925,747 | 5/1990 | Kordesch et al . |
| 4,983,474 | 1/1991 | Doi et al. . |
| 5,034,289 | 7/1991 | Yuasa et al. . |
| 5,043,233 | 8/1991 | Kameoka et al. . |
| 5,043,234 | 8/1991 | Tomantschger et al. . |
| 5,082,754 | 1/1992 | Jones . |
| 5,096,667 | 3/1992 | Fetcenko . |
| 5,104,617 | 4/1992 | Fetcenko et al. . |
| 5,106,707 | 4/1992 | Catotti et al. . |
| 5,128,219 | 7/1992 | Kohler et al. . |
| 5,131,920 | 7/1992 | Moriwaki et al. . |
| 5,143,799 | 9/1992 | Tsenter . |
| 5,162,169 | 11/1992 | Tomantschger et al. . |
| 5,166,596 | 11/1992 | Goedken . |

OTHER PUBLICATIONS

Sammarco, John J. "Intrinsically Safe 5-V, 4-A Rechargeable Power Supply." *Bureau of Mines Information Circular*, 1989.

*Primary Examiner*—Anthony Skapars
*Attorney, Agent, or Firm*—Pearne, Gordon, McCoy & Granger

[57] ABSTRACT

A sealed rechargeable storage battery containing one or more rechargeable working cells and at least one regulator cell. The working cells are capable of generating gas in a gas space within the sealed battery during charging of the working cells. The regulator cell is in gaseous communication with the gas space, the regulator cell being chargeable and dischargeable by a control circuit to regulate the amount of gas in the gas space.

19 Claims, 4 Drawing Sheets

SEALED RECHARGEABLE BATTERY

BACKGROUND OF THE INVENTION

Rechargeable battery cells with solid electrodes are of two general types: (1) open or vented, sometimes referred to as "flooded"; and (2) sealed, commonly referred to as "starved". Generally, in a flooded cell, the electrodes are immersed in electrolyte, while in a starved cell, the electrodes are not immersed in electrolyte. These two types of batteries differ primarily in the way in which they deal with gases, namely oxygen and/or hydrogen, which are generated in the battery cells toward the end of the charging operation and during overcharging.

Type 1 allows the gases to vent to the atmosphere; in Type 2 the gases (primarily oxygen) are recombined back into water inside the sealed battery cell. Type 2 is preferred from the user's point of view because the sealed cell requires no periodic maintenance, maintains charge balance between the plates, can operate in any position, releases no explosive gases and does not leak corrosive chemicals into the environment.

Two different kinds of sealed cells (Type 2) are known in the industry. One is a standard design common in consumer cylindrical and small prismatic or rectangular cells up to about 50 Ah capacity for Ni-Cd, and about 500 Ah for Pb-Acid. The other (which has been commercialized for Ni-Cd batteries only) employs recombination plates and uses a split negative plate and is available in up to about 100 Ah capacity. Although different in construction and performance, both of these sealed cells share some fundamental principles, as follows.

1. They attempt to minimize hydrogen evolution by using an excess of discharged negative material and rely on the oxygen cycle to maintain discharged negative material in the cell at all times.
2. They are limited to individual vessel designs, that is, individual cells each hermetically sealed to ensure that all oxygen generated in a particular cell will recombine in the same cell (with some exception for monoblock Pb-Acid that sometimes use common gas space).
3. They use starved electrolyte in the stack of electrodes and separators to permit oxygen transport to the negative electrode. This dictates tight stacking of electrodes, small interelectrode distance and close control of the electrolyte level in the cell.
4. If placed in a multiple cell battery, they require close matching of cell capacities, charge efficiencies and temperatures to guarantee long life and avoid cell reversal, hydrogen evolution, overpressure and overheating.

Vented cells, on the other hand, are more robust. They do not require as tight a control in manufacturing, they are less sensitive to overcharge and overdischarge or deep discharge, and there is less concern with cell temperature and pressure. They are generally less expensive to build and more applicable to large cells as well as large batteries, yet they pose considerable difficulties to the user who is concerned with periodic maintenance, explosive gas releases into the environment, electrolyte splashing, and loss of plate balance in the cells.

The above discussion indicates the need for a battery that is sealed and requires no maintenance, yet is more robust in design, manufacturing and use, more applicable to large cells and large multi-cell batteries, easy to produce at economical costs and offers advantages in energy density.

A prior U.S. Patent which tried to address some of these problems was U.S. Pat. No. 5,143,799, which is hereby incorporated in its entirety by reference herein. This patent disclosed a sealed rechargeable nickel zinc or silver zinc cell which was divided into two compartments, one having a zinc electrode and a first hydrogen electrode and a second having a nickel or silver electrode and a second hydrogen electrode electrically connected to the first hydrogen electrode. A common gas space was provided for the two compartments so that the hydrogen and oxygen gases could recombine to water and the container could be sealed. Among other expensive features, this battery requires a hydrogen electrode in each cell, which is very costly, and the cells need to be starved.

SUMMARY OF THE INVENTION

The invention is directed to a sealed rechargeable storage battery containing one or more rechargeable working cells which are capable of generating gas in a gas space within the sealed battery during charging of the rechargeable working cells. At least one regulator cell is provided within the battery and it is in gaseous communication with the gas space. The regulator cell is chargeable and dischargeable by a control circuit to regulate the amount of the gas in the gas space. The control circuit is preferably external to said battery. Excessive gas is an amount or concentration or pressure of gas above a desired or preselected amount or concentration or pressure of gas. Typically, excessive gas pressure is more than about 1.5 atm absolute (ata).

The invention is further directed towards a rechargeable sealed battery of common vessel construction. Such a battery may have a nickel oxide, silver oxide, or manganese dioxide positive electrode as well as a cadmium, iron, metal hydride, or zinc negative electrode. The discussion will focus on that which is most commonly used in rechargeable alkaline batteries with solid electrodes, nickel oxide positive electrode in combination with cadmium negative electrodes. This combination is known by the common name Ni-Cd battery, often pronounced Nicad. Nevertheless, in most cases, in this discussion nickel oxide could be replaced with silver oxide (AgO) and manganese dioxide ($MnO_2$), and cadmium could be replaced with zinc (Zn), metal hydride (MHx), or Iron (Fe). Accordingly, other battery combinations to which this invention could apply include Ni-Zn, Ni-Fe, Ni-MHx, Ag-MHx, Ag-Cd, Ag-Zn, Ag-Fe, and $MnO_2$-Zn. Also the basic principles could apply to non-alkaline rechargeable battery systems such as $PbO_2$-Pb (known as lead acid).

The invention may comprise a common vessel sealed rechargeable battery which comprises in combination a sealed housing, a plurality of a first type of cells within the sealed housing, means for connecting all cells in series, positive and negative terminals connected through a wall of the sealed housing to positive and negative ends of the series connected cells, one or more cells of a second type, connected in parallel with each other, within said sealed compartment and having a common gas space filled or charged with hydrogen with cells of said first type, at least one metal electrode and at least one hydrogen electrode in said second cell type, a hydrogen terminal connected through a wall of the sealed housing to the hydrogen electrodes in said second cell type, and means to make external connection to said negative electrode of said second cell type. Preferably, positive hydrogen gas pressure, generally less than 1 atm absolute, is maintained in the battery at all times.

Further, the invention may be summarized as a sealed rechargeable storage battery having a sealed container filled or charged with hydrogen, at least one rechargeable cell inside the sealed container, a regulator of pressure inside the container, a pressure sensor mounted to sense pressure inside the sealed container, a common gas space inside said container for said at least one rechargeable cell and said pressure regulator, and at least three terminals extending in a sealed manner through the container and connected to said at least one rechargeable cell and to said pressure regulator.

The invention may further be summarized as a rechargeable battery comprising in combination, a sealed container having a wall, a plurality of working cells in said container, negative and positive electrodes in each of said working cells, means connecting cells of said working cells in series between positive and negative terminals extending through a container wall for external connection to said series connected cells, one or more regulator cells in said sealed container, a common gas space filled or charged with hydrogen for all said cells in said sealed container, hydrogen electrodes and a metal electrode in said regulator cell, and means providing external connection to said electrodes in said regulator cell.

An object of the invention, therefor, is to provide a rechargeable sealed battery which has the advantages of a vented battery and of a sealed battery.

Another object of the invention is to provide a sealed battery which requires no periodical maintenance, maintains charge balance between the plates, releases no explosive gases, and does not leak corrosive chemicals into the environment.

Another object of the invention is to provide a rechargeable battery which may be sealed as distinct from having to seal individual cells.

Another object of the invention is to provide a sealed rechargeable battery which includes a rechargeable regulator wherein discharging the regulator generates hydrogen; charging the regulator consumes hydrogen, and in open circuit stoichiometric amounts of hydrogen and oxygen are consumed. This gives the unique possibility of operating a sealed battery with individual cells that are of vented design (flooded) with capability of dealing with both oxygen and hydrogen evolution.

Other objections and a fuller understanding of the invention may be had by referring to the following description and claims, taken in conjunction with the accompanying drawings.

DESCRIPTION OF THE PREFERRED EMBODIMENT

Figure 1:
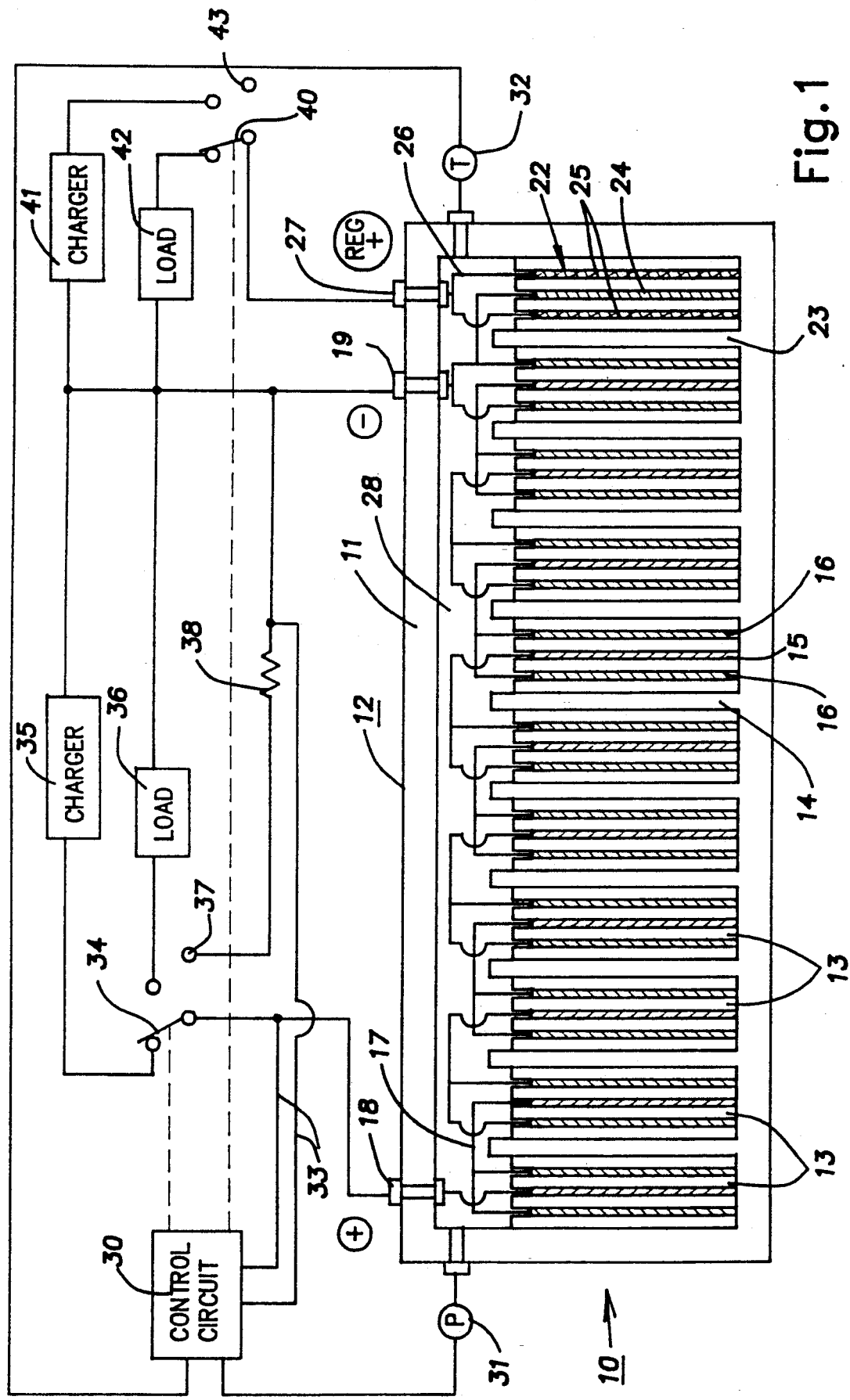
FIG. 1 illustrates a sealed rechargeable battery according to the invention.

FIG. 1 shows diagrammatically a sealed rechargeable battery 10 which has a wall 11 forming a hermetically sealed container or caselike housing 12. At least one working cell 13 of a first type is provided in the battery. Usually the battery will contain a plurality of such cells 13 and in this case ten of such cells 13 have been shown. Fluid impermeable barriers 14 separate each of the cells, and each cell includes at least one positive electrode 15 and at least one negative electrode 16. In the illustrated battery, two negative electrodes 16 are shown with a single positive electrode 15 for each cell. The invention will be described in terms of Ni-Cd cells and a Cd-$H_2$ regulator, but it will be noted that in principle it is possible to use in conjunction with a working Ni-Cd battery (Ni-Fe, Ni-Zn, Ag-Zn, Pb-$PbO_2$, Ni-MHx, etc.) several types of M-$H_2$ regulator cells, where M represents any stable reversible metal electrode such as Cd, Zn, Fe, Pb, etc.

The working cells 13 are a string of several vented, slightly flooded, Ni-Cd cells which are connected in series by conductors 17 with one end of the series being connected in a sealed manner through the wall of the container 12 to an external positive terminal 18. The other end of the series is connected through the wall of the container 12 to an external negative terminal 19.

A regulator for the working cells is provided inside the sealed case 12 in accordance with the present invention. This regulator is capable of generating and consuming hydrogen and consuming oxygen and in this preferred embodiment is a regulator or auxiliary cell 22. It is within the sealed case 12 but it is electrochemically separated from the working cells by a fluid impermeable barrier 23. The regulator cell 22 includes at least one metal electrode 24 and at least one hydrogen electrode 25. The hydrogen electrodes 25 may be connected by a conductor 26 to pass through the wall of the container 12 to an external hydrogen terminal 27. The terminal 27 is termed a "hydrogen" terminal because a principle function of the regulator cell 22 is to produce hydrogen or conversely to consume hydrogen in order to effect a balance with the working cells 13. The regulator cell 22 and the working cells 13 share a common gas space 28 so that hydrogen and oxygen are free to intermingle and combine. Alternatively, each cell could have an individual gas space above it, with all these gas spaces in gaseous communication with each other. The hydrogen electrode 25 is a catalytic electrode known in the art from fuel cells or nickel-hydrogen cells. This electrode must have good activity to hydrogen, must operate at low pressures, and must be stable in an alkaline electrolyte. The preferred alkaline electrolyte will feature potassium hydroxide with possibly some lithium hydroxide and/or sodium hydroxide as well known in the art. The electrolyte in the working cells could be different from the one in the regulator, but the total electrolyte activity of the two electrolytes should preferably be the same since all cells are under common vapor pressure. The regulator cell is "starved", with only enough electrolyte to wet the plates and separators to guarantee effective gas diffusion to the hydrogen electrode.

The sealed container 12 may have a fourth terminal connected to the metal electrode of the regulator. However, for better economy, the negative terminal of the battery and of the regulator cell may be common as shown in FIG. 1.

OPERATION

When the battery is discharging, the battery operates as a regular vented battery, with all the advantages of a vented flooded electrolyte battery while still being sealed from the environment.

In a charging condition, the battery operates as a regular vented battery until the onset of gas evolution.

Reactions at Regulator

Case 1: Preferential oxygen evolution on nickel-oxide electrode. Oxygen is generated on the nickel electrode and is chemically recombined in the regulator cells with the $H_2$ that is in the battery to produce water.

1.1 Chemical reaction at hydrogen electrode:

(1.1) $H_2 + \tfrac{1}{2}O_2 \rightarrow H_2O$

This will reduce pressure in the battery and cause rapid temperature rise because of the exothermal nature of the recombination reaction. To restore hydrogen pressure we activate the regulator according to reaction 1.2.

1.2 Electrochemical discharge of regulator:

(1.2a) $Cd - 2e + 2(OH) \rightarrow Cd(OH)_2 - $ (Cd electrode)

(1.2b) $2H_2O + 2e \rightarrow H_2 + 2(OH) - $ (Hydrogen electrode)

The sum of 1.2a and 1.2b is (1.2c):

(1.2c) $Cd + 2H_2O \rightarrow Cd(OH)_2 + H_2$

If all hydrogen in the battery is consumed by reaction (1.1) and reaction (1.2) is not activated, then reaction (1.3) will occur.

1.3 Chemical reaction at cadmium electrode:

(1.3) $Cd + \tfrac{1}{2}O_2 + H_2O \rightarrow Cd(OH)_2$

Case 2: Cadmium electrodes in preferential overcharge. In this case, the $H_2$ pressure in the cell increases as well as the battery voltage. To maintain hydrogen pressure, hydrogen is consumed in the regulator according to reaction 2.a.

2.a Charge regulator cell:

(2.a) $Cd(OH)_2 + H_2 \rightarrow Cd + 2H_2O$ (Reduce hydrogen pressure)

Which is equivalent to reverse reaction (1.2.c)

Case 3: Nickel and Cadmium in overcharge. In this case, oxygen and hydrogen are produced and chemically recombined on the hydrogen electrode in the regulator cell to produce water and a large amount of heat (Reaction 1.1) and the regulator is in passive (open circuit) mode.

Increased pressure, reduced pressure, increased voltage, and a rise in temperature will all serve to indicate overcharge conditions and will trigger a signal to the charger to reduce the charge rate or terminate charging. The rise in battery voltage on charge is on the order of 300 millivolts per cell. The rise in temperature during charge is on the order of 5–10° C. Preferably, an overall gas pressure rise of about 0.1 atm will trigger a change in the rate of charging. Preferably, charging is terminated upon an overall gas pressure rise of about 1 atm. The subject battery in accordance with the invention can be fast charged since overcharge conditions are promptly detected via change in gas pressure. Most of the heat generation takes place in the regulator cell upon recombination of hydrogen and oxygen to form water.

In FIG. 1, a control circuit 30 is shown having input from a pressure transducer 31, a temperature probe 32, preferably at the location of the regulator cell 22, and a voltage input via conductors 33 across the terminals 18 and 19. These inputs to the control circuit control the output, such that the control circuit controls a selector switch 34 which may be used to select a charger 35, a load 36 or, in effect, an open circuit 37 condition for the working cells of the battery. The control circuit may also control another selector switch 40 to selectively control a charger 41, discharger or load 42, or an open circuit terminal 43 for the regulator cell 22.

In open circuit, the battery will operate at nominal hydrogen pressure in a preferred method of operation. If nickel oxide electrodes evolve oxygen in open circuit, the oxygen will react with the hydrogen in the cell to produce water. This will reduce the pressure in the cell. To counteract this effect it is possible to: discharge the regulator (reaction 1.2c) and produce hydrogen; or maintain the working cells at lower potential for minimum oxygen evolution via an external load such as high resistance 38. Preferably, oxygen gas in the gas space is minimized because oxygen gas can passivate or otherwise inactivate or adversely affect the hydrogen electrode.

The Ni-Cd cell will thus operate as a standard vented design. In principle, any type of nickel and Cd electrode can be used, however, excessive electrolyte can be very minimal. This would be a slightly flooded design for the working cells.

The regulator cell 22 should contain enough cadmium capacity to serve as an overcharge reserve for the full battery. For example, if the battery is constructed with ten Ni-Cd cells in series at 100 Ah each and one regulator cell, and if one wishes to allow for a cumulative 10% of total positive electrode capacity to evolve oxygen with no hydrogen evolution, the metallic Cd capacity of the auxiliary cell should be at least: $100 \times 10 \times 10\% = 100$ Ah.

Balancing the battery is a part of the design criteria. To obtain a chemical and pressure balance, the regulator cell or cells serve as an overcharge buffer and end of charge detector. It is desirable to return to the nominal operating window that incorporates in the cell partially charged cadmium electrodes and moderate hydrogen pressure. The state of charge of the cadmium electrodes in the regulator and the gas pressures in the cell can be adjusted throughout the life of the battery by charging or discharging the regulator.

Typically, batteries that are deep discharged will become unbalanced after some time, and weak cells will reverse and will generate $H_2$ gas. In the subject battery this will be detectable because the gas pressure in the common gas space will increase, which will be detectable by the pressure sensor. Accordingly, deep discharge can be detected and in an application such as an electrical vehicle or other traction battery, a signal or indicator can be activated, indicating to the operator that the battery needs recharging. Additionally, the regulator cell can be activated to consume the $H_2$ gas. Furthermore, the regulator cell is capable of being charged or discharged independently of the charging or discharging of the working cells in the battery, and vice versa.

The electrolyte and water balance is also part of balancing the battery. During overcharge gas will evolve in the working electrodes and produce water in the auxiliary cell. This will result in increasing the concentration of electrolyte in the working cells and decreasing the concentration of electrolyte in the auxiliary cell; however, all the cells share a common gas space 28. Since the vapor pressure of dilute electrolyte is higher than that of concentrated electrolyte, water will evaporate from the auxiliary cell and condense in the working cells. This will occur until electrolyte activity is equalized. In effect, all the water that moves to the auxiliary cell during overcharge will, over time, reverse or revert back to the working cells, to result in zero net movement of water or electrolyte. This results in a self balancing situation.

The advantages of these aspects of the invention are:
1. Savings in weight, volume and cost.
   a. No excess CdO
   b. No excess electrolyte (compared to vented design)
   c. Single low pressure container for 10 cells
   d. Only three or four terminals for 10 cells
2. Sensitive overcharge detection via change of pressure and rapid rise in temperature.
3. More adaptable to large multi-cell battery. The first cell that overcharges or goes into reverse will affect the total pressure as well as temperature balance in the battery and will generate a signal to change the electrical state.
4. Lower manufacturing tolerance requirements.
5. None of the disadvantages of a vented cell battery.
6. The hydrogen atmosphere in the battery is protective of the electrodes and the separators and will enhance component life compared to the oxygen atmosphere typical of sealed Ni-Cd cells.

EXAMPLE AND TEST

The basic idea of the present invention has been verified with a 5-cell Ni-Cd sealed rechargeable battery with 0.4 Ah capacity.

Fibrous nickel and cadmium electrodes were employed for the working cells 13 and cadmium and hydrogen electrodes for the regulator 22. The capacity of the cadmium electrode of the regulator was 0.40 Ah.

The hydrogen electrode was the same design as used for nickel-hydrogen cells known in the art. The active layer contained a mixture of platinum (4 mg/cm$^2$) and tetrafluoroethylene polymer known as Teflon and available from Du Pont pressed on a nickel screen and a diffusion back layer which contained only tetrafluoroethylene polymer to provide fast diffusion of hydrogen under low pressure.

The cells were connected in series and were placed in a vessel with a single regulator cell. The vessel was filled with 0.5 atm of hydrogen. The battery had three terminals: one positive for the working cells, one positive for the regulator, and a common negative for the working cells and the regulator. The above-described battery was used for the tests reported in FIGS. 2-5.

Figure 2:
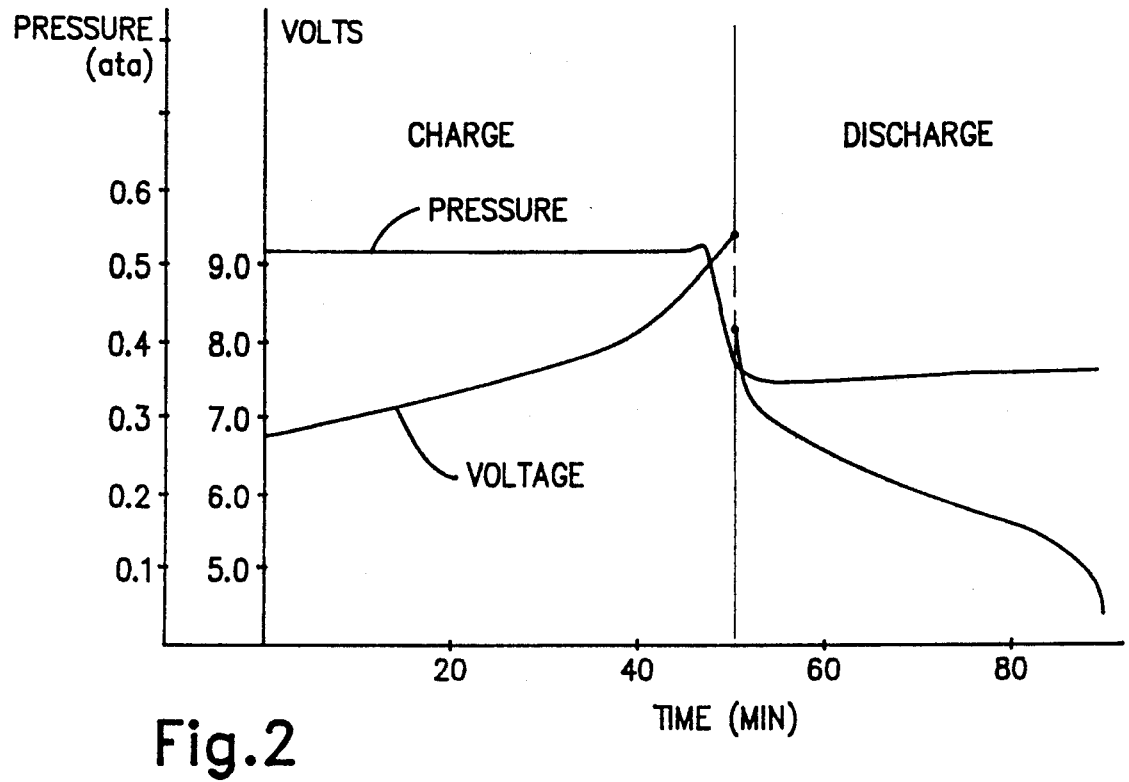
FIG. 2 is a graph which shows variations in battery voltage and pressure during charge and discharge.
Figure 3:
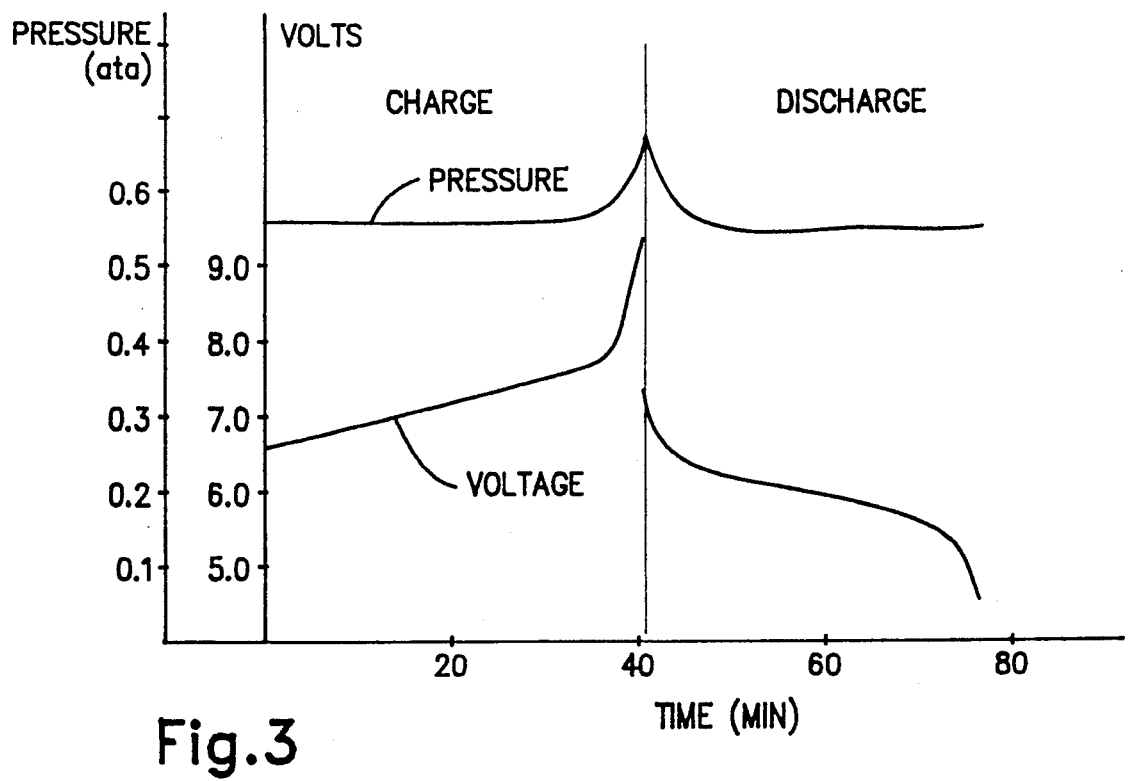
FIG. 3 is also a graph which shows variations in battery voltage and pressure during charge and discharge.
Figure 4:
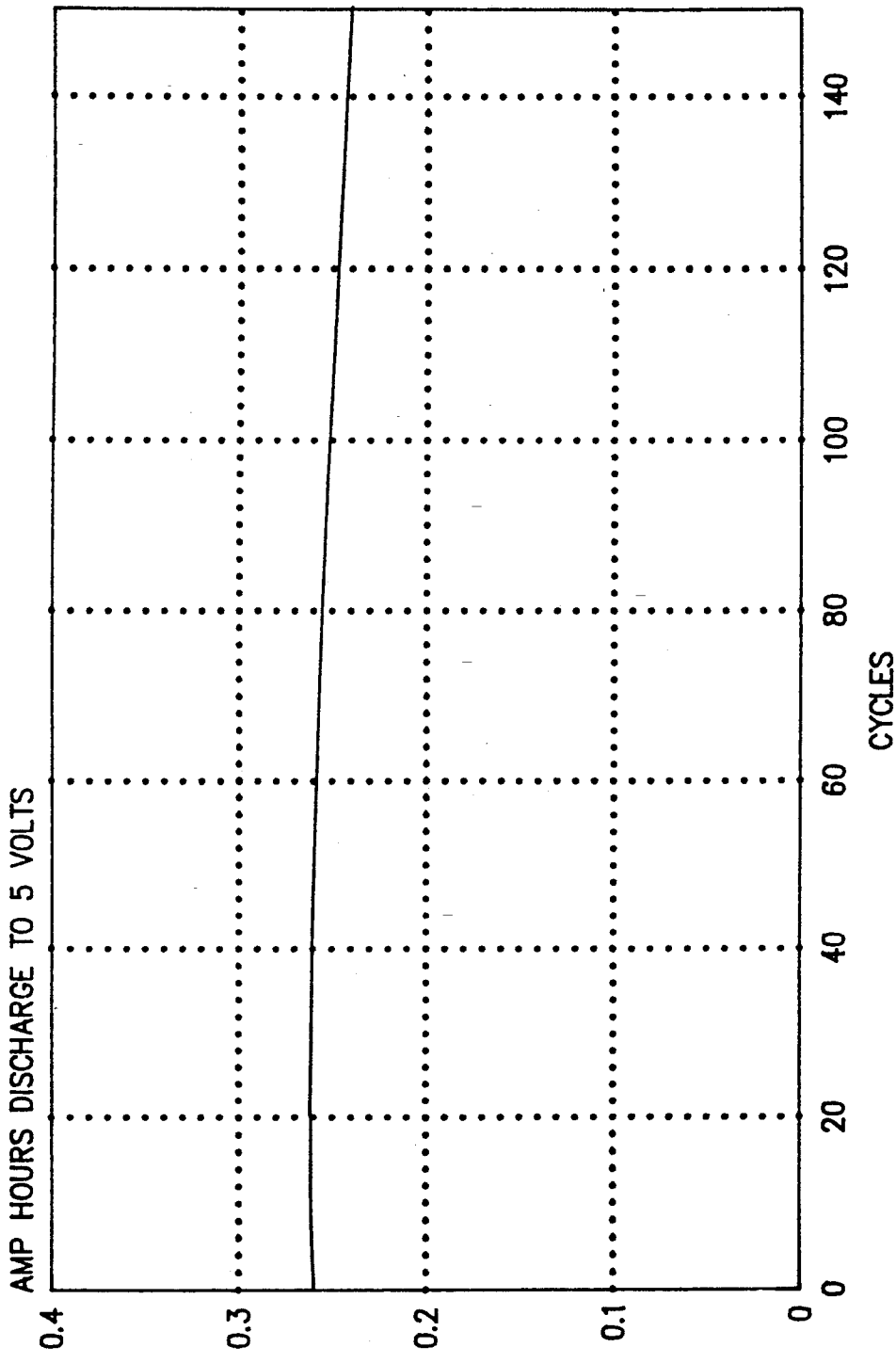
FIG. 4 illustrates battery capacity of a test battery over 140 cycles.

This design was tested, as shown in FIGS. 2-4, by cycling at currents of 0.5A (1.25C$_5$) for both charge and discharge modes at room temperature. The charge was terminated by a change in pressure of 0.1 atm and the discharge was down to 5 volts; these conditions applied to FIGS. 2-4.

FIG. 2 shows variations in battery voltage and pressure during charge and discharge at room temperature. After some pressure increase caused by oxygen evolution, pressure drops as a result of oxygen and hydrogen combining on the hydrogen electrode to form water. The pressure drop triggers a signal to the charger to reduce the charge rate or terminate charge. Charging is terminated upon a rise of a little more than 1.8 volts and a pressure drop of about 0.1 atm. Hydrogen pressure is restored by means of discharging the regulator. The regulator would be active in this event.

FIG. 3 also shows variations in battery voltage and pressure during charge and discharge at room temperature. Overcharging is occurring and $O_2$ and $H_2$ are evolved, causing a pressure rise. The rise in pressure during charge is the same as the drop in pressure during discharge. The regulator is passive in this event and is used for consumption of stoichiometric amounts of hydrogen and oxygen. This indicates that the overall evolution of oxygen and hydrogen is stoichiometric. The regulator was electrically passive in FIG. 3; it recombined oxygen and hydrogen but was not charging or discharging.

FIG. 4 is based on the same test as FIG. 3 and displays battery capacity of the above-described battery over 140 cycles. The regulator was kept passive as the overall gas evolution was stoichiometric. As can be seen, the battery displayed stable performance.

Figure 5:
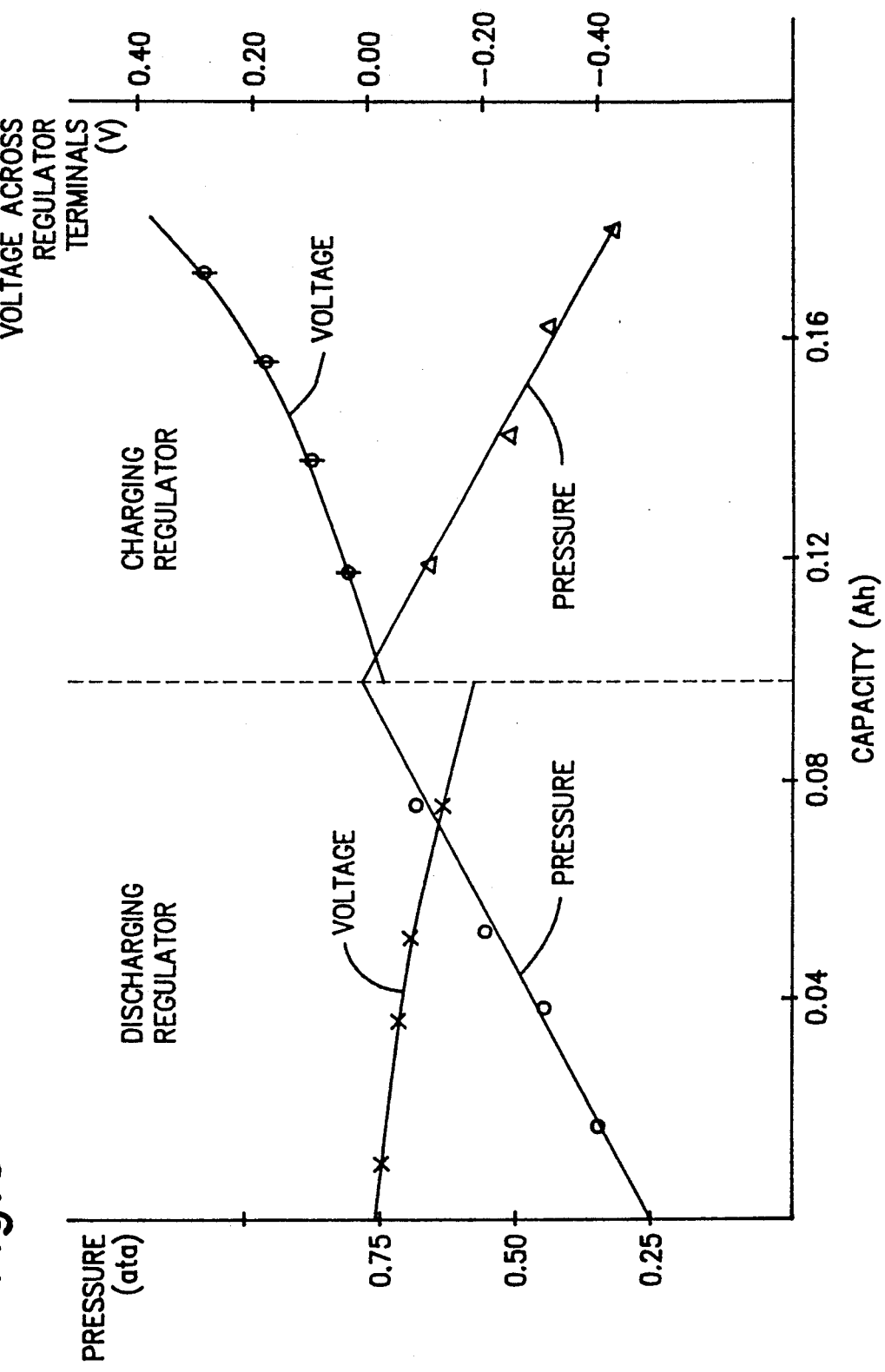
FIG. 5 is a graph which shows variations in regulator voltage and battery pressure during charging and discharging of the regulator.

FIG. 5 shows that, in accordance with the invention, the regulator cell can be charged and discharged at room temperature to effectively control the gas pressure in the battery and to significantly change the gas pressure in the battery with only a small amount of energy being consumed.

As noted above, the present invention also applies to non-Ni-Cd batteries. Characteristics and features of some of these are discussed below.

1. Ni-Zn with Zn-H$_2$ regulator a. This battery provides a means for consuming both oxygen and hydrogen without the need to split all individual cells. This is in contrast to the battery disclosed in U.S. Pat. No. 5,143,799.

b. For this system there may be a trade off between using a flooded electrolyte design to provide a better overcharge reservoir versus using starved electrolyte to minimize zincate ($ZnO_2^{-2}$) migration.

c. With this design it is possible to generate hydrogen on the nickel electrodes at positive cell voltage to restore hydrogen pressure.

2. Ag-Zn

The discussion in a, b, and c immediately above also applies here. In addition, since both electrodes require very little overcharge, the amount of usage of the regulator and thus its capacity (overcharge reservoir) can be much reduced.

3. Ni-MHx (Nickel Metal Hydride)

a. This system generally operates at hydrogen pressure. However, the equilibrium pressure is temperature dependent. Thus, charge adjustment and termination will have to be triggered more by the temperature signal than by the pressure signal.

b. The lifetime of the metal hydride electrode should be drastically improved compared to standard designed Ni-MHx cells, since the metal hydride electrodes of the working cell will not have to support oxygen reduction. The latter reaction is known to degrade the metal hydride.

c. The present invention will permit the construction of large nickel metal hydride cells which are impractical to operate in a standard sealed-cell design.

d. The operating pressure is likely to be higher than that of Ni-Cd monoblock, probably a few atmospheres.

e. It is believed that it is possible to have a cylindrical vessel with little volume penalty. This is advantageous since cylindrical vessels can withstand higher pressures than prismatic ones.

4. Nickel Iron (Ni-Fe), with Cd-$H_2$ or Fe-$H_2$ regulator a. This design allows for a sealed nickel iron battery, which is currently unknown in the art.

b. The capacity of the regulator will have to be bigger than that of a Ni-Cd battery regulator, due to the poor charging efficiency of the iron electrode.

5. Lead Acid (Pb-Acid)

In this battery the reaction at the regulator is:

$$PbSO_4 + H_2 \rightarrow Pb + H_2SO_4$$

Pb-Acid batteries are available in a flooded, and semi-sealed Valve Regulated Lead Acid construction, known as VRLA.

The life of the VRLA battery is considerably shorter than the life of a flooded battery. This is because the valve of the VRLA battery occasionally opens to allow excess gas to escape and causes the starved cell stack to dry out. The present invention provides for a sealed battery which uses flooded cells. Thus lifetime before dryout will be greatly extended since the individual cells feature excess electrolyte.

The present disclosure includes that contained in the appended claims, as well as that of the foregoing description. Although this invention has been described in its preferred form with a certain degree of particularity, it is understood that the present disclosure of the preferred form has been made only be way of example, and that numerous changes in the details of the circuit and the combination and arrangement of circuit elements may be resorted to without departing from the spirit and scope of the invention as hereinafter claimed.

What is claimed is:

1. In a sealed rechargeable storage battery containing one or more rechargeable working cells capable of generating gas in a gas space within said sealed battery during charging of said rechargeable working cells, the improvement comprising at least one regulator cell provided within said battery and in gaseous communication with said gas space, said regulator cell being chargeable and dischargeable by a control circuit to regulate the amount of said gas.

2. A battery according to claim 1, wherein the regulator cell is a metal hydrogen cell capable of consuming or generating hydrogen gas in said gas space to thereby regulate the amount of gas in the gas space.

3. A battery according to claim 1, wherein said gas space is common to all of said rechargeable working cells and to said regulator cell and said gas space is charged with hydrogen.

4. A battery according to claim 2, including at least three electrical terminals for connecting the battery into an electrical circuit, at least one of said terminals being connected to a hydrogen electrode of said metal hydrogen cell via which said regulator cell is chargeable and dischargeable independent of the charging and discharging of said rechargeable working cells.

5. A battery according to claim 1, including means for sensing the gas pressure within said gas space wherein said sensed gas pressure can be used to control the charging and discharging of said regulator cell.

6. A battery according to claim 1, including means for sensing a temperature of said battery wherein said sensed temperature can be used to control the charging and discharging of said regulator cell.

7. A sealed rechargeable storage battery comprising:
a sealed housing;
a plurality of rechargeable working cells within the sealed housing;
means for connecting said working cells in electrical series relationship with each other;
positive and negative terminals connected through a wall of the sealed housing to respective positive and negative ends of the series connected working cells;
at least one regulator cell within said sealed housing and having a common gas space with said working cells;
a metallic electrode and a hydrogen electrode in said regulator cell;
a hydrogen terminal connected through a wall of the sealed housing to the hydrogen electrode in said regulator cell; and
means to make external connection to said metallic electrode of said regulator cell.

8. A battery as set forth in claim 7, including an electrolyte in each of said cells; and means to prevent intermingling of the electrolytes of said working cells and said regulator cell.

9. A battery as set forth in claim 7, including a pressure sensor connected to be responsive to the pressure in said common gas space of said sealed housing.

10. A battery as set forth in claim 7, wherein said regulator cell is capable of generating or consuming hydrogen within said common gas space.

11. A battery as set forth in claim 7, wherein the regulator cell is capable of being charged or discharged independently of the charging or discharging of the working cells in the battery.

12. A sealed rechargeable storage battery comprising in combination:
a sealed housing;
at least one rechargeable cell inside said sealed housing;
a pressure regulator cell inside said housing;
a pressure sensor mounted to sense pressure inside said sealed housing;
a common gas space inside said housing for said at least one rechargeable cell and said pressure regulator cell; and
at least three terminals extending in a sealed manner through the housing and connected to said at least one rechargeable cell and to said pressure regulator cell.

13. The battery as set forth in claim 12, wherein said sealed housing common gas space contains hydrogen.

14. The battery as set forth in claim 12, wherein the gas pressure in said common gas space is regulated by means of charging or discharging said regulator cell in response to said pressure sensor.

15. The battery as set forth in claim 12, wherein one of said three terminals is connected solely to said pressure regulator cell.

16. The battery as set forth in claim 14, wherein the charging of the battery is terminated upon any one of the pressure in the common gas space rising above or dropping below a given pressure range, with temperature rising above a given value, and with the voltage of the battery rising above a given value.

17. The battery of claim 12, wherein the rechargeable cell is any one of nickel-cadmium, nickel-zinc, silver-zinc, nickel-metal hydride, nickel-iron, manganese-zinc, and lead-acid (Pb-PbO$_2$).

18. The battery as set forth in claim 12, wherein the regulator cell is comprised of a metal-hydrogen reversible cell.

19. The battery of claim 18, wherein the regulator cell is a rechargeable cell of any one of cadmium-hydrogen, iron-hydrogen, zinc-hydrogen, metal hydride-hydrogen and a lead-hydrogen cell.

* * * * *